(No Model.)

4 Sheets—Sheet 1.

C. E. RICHSON.
INDICATING AND ADDING APPARATUS.

No. 466,836.

Patented Jan. 12, 1892.

Witnesses.
Howard F. Eaton.
S. C. Fearing.

Inventor:
Carl E. Richson
By Jas. H. Churchill
Atty.

(No Model.) 4 Sheets—Sheet 2.
C. E. RICHSON.
INDICATING AND ADDING APPARATUS.

No. 466,836. Patented Jan. 12, 1892.

Witnesses.
Howard F. Eaton.
S. C. Fearing.

Inventor.
Carl E. Richson.
By Jas. H. Churchill
Atty.

(No Model.) 4 Sheets—Sheet 3.
C. E. RICHSON.
INDICATING AND ADDING APPARATUS.
No. 466,836. Patented Jan. 12, 1892.
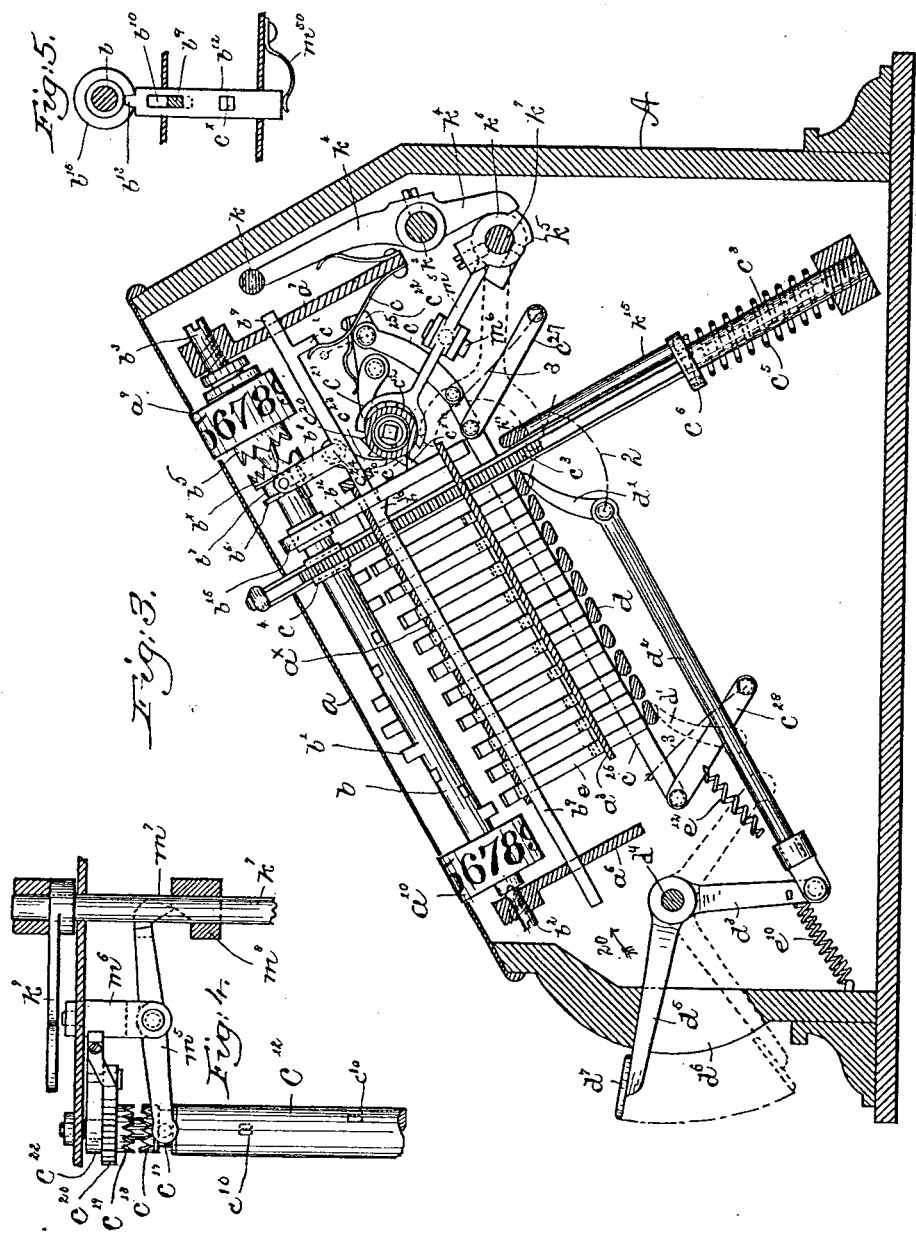
Witnesses.
Howard F. Eaton.
S. C. Fearing.
Inventor
Carl E. Richson.
By Jas. H. Churchill
Atty.

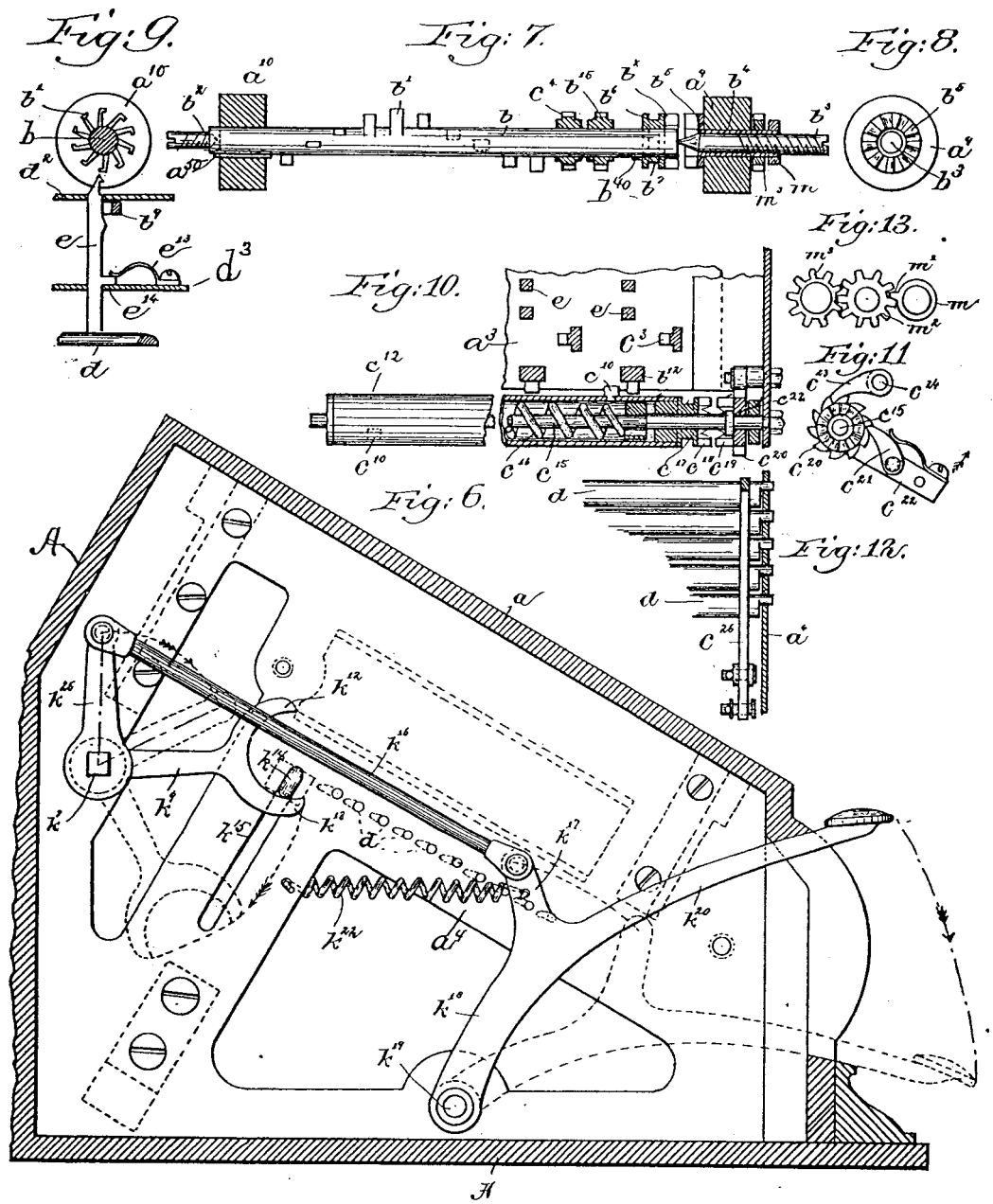

UNITED STATES PATENT OFFICE.

CARL E. RICHSON, OF BOSTON, MASSACHUSETTS.

INDICATING AND ADDING APPARATUS.

SPECIFICATION forming part of Letters Patent No. 466,836, dated January 12, 1892.

Application filed March 30, 1891. Serial No. 387,078. (No model.)

*To all whom it may concern:*

Be it known that I, CARL E. RICHSON, of Boston, county of Suffolk, and State of Massachusetts, have invented an Improvement in Indicating and Adding Apparatus, of which the following description, in connection with the accompanying drawings, is a specification, like letters on the drawings representing like parts.

This invention relates to an apparatus especially adapted for adding different numbers, and has for its object to provide an efficient and simple apparatus for accomplishing this purpose.

The particular features in which my invention consists will be hereinafter described, and pointed out in the claims at the end of this specification.

Figure 1:
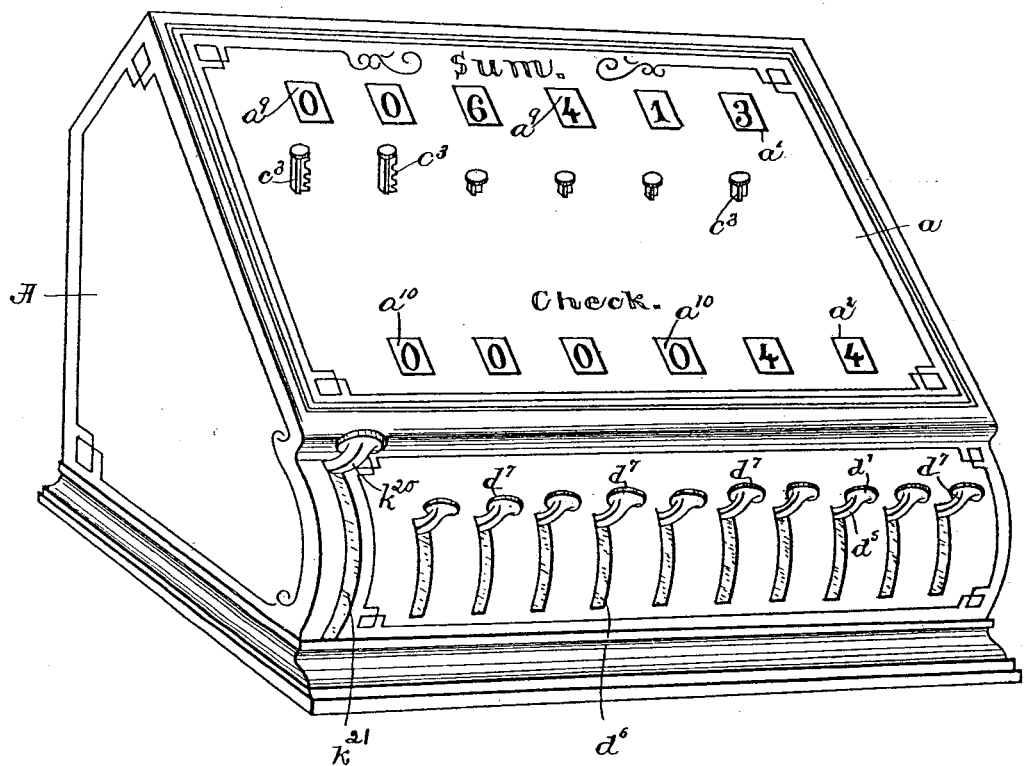
Figure 2:
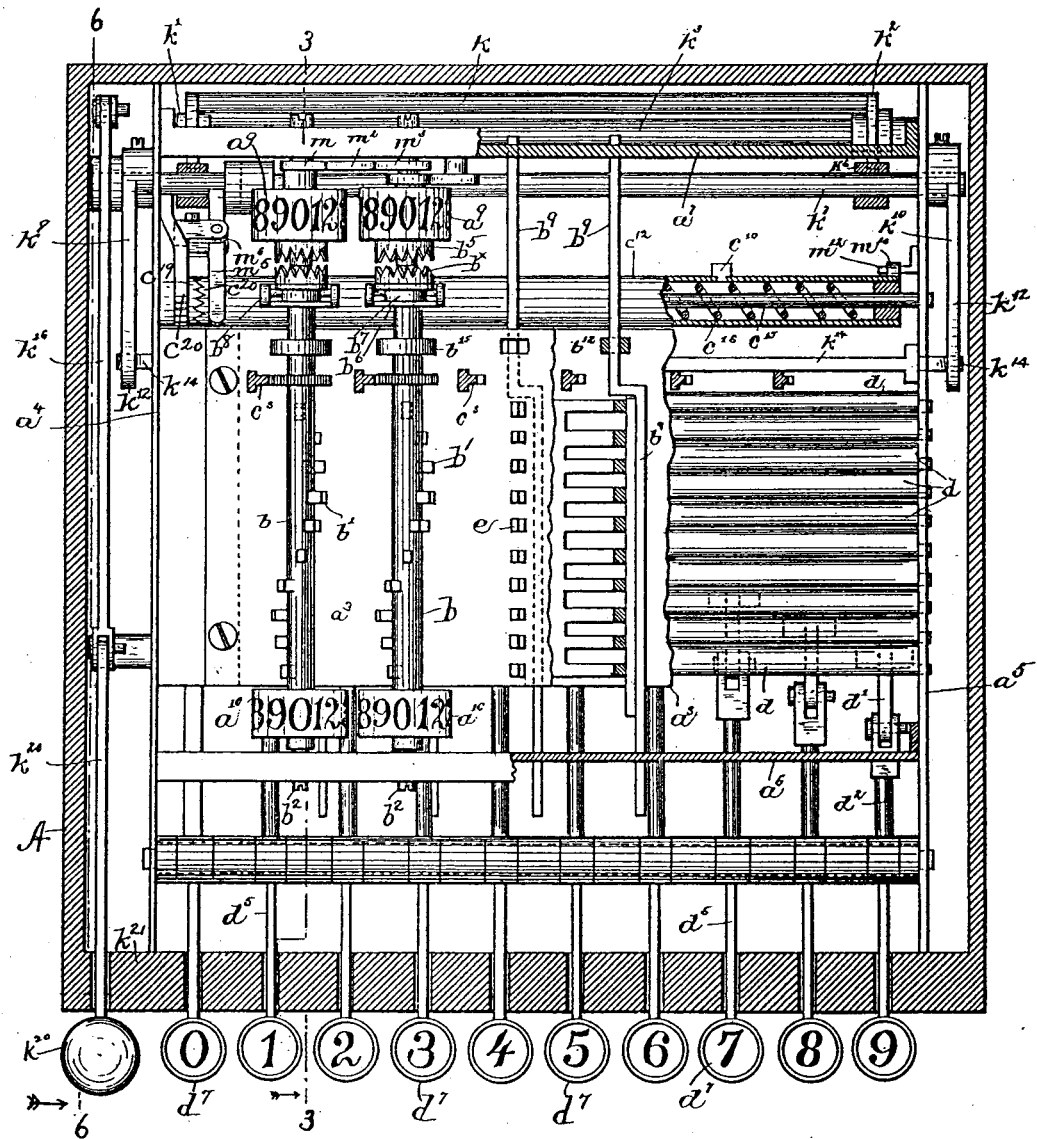

Figure 1 is an isometric view of one form of apparatus embodying my invention; Fig. 2, a top or plan view of the apparatus shown in Fig. 1, with the upper portion of the inclosing case removed and parts of the apparatus broken out; Fig. 3, a longitudinal section of the apparatus, the section being supposed to be taken on the line 3 3, Fig. 2, the disks and roller being shown in elevation; Fig. 4, a detail to be referred to; Fig. 5, a detail to more clearly show the locking-bar; Fig. 6, a section of the apparatus shown in Fig. 2 on line 6 6, looking toward the right, to more clearly show the mechanism for restoring the parts to their normal position; Fig. 7, a detail of one of the disk-carrying shafts or rollers; Fig. 8, an end view of one of the disks and its shaft; Fig. 9, a detail to more clearly show the stopping-bar for the disk-carrying shaft; Fig. 10, a detail partially broken out to show the hollow cylinder and the locking-bars operated by it; Fig. 11, a detail of the ratchet mechanism for rotating the hollow cylinder; Fig. 12, a detail in plan of the rocking bars, and Fig. 13 a detail of the gearing connecting the disks on different shafts.

The inclosing case A, containing the operating parts of my improved apparatus, may be made of wood, metal, or other suitable material. The case A is preferably provided with a downwardly-inclined top $a$, having, as herein shown, two rows of apertures $a'$ $a^2$ extended across the said case, preferably near the top and the bottom of the top plate. The inclosing case contains within it a supporting-frame consisting, as herein shown, of two plates or pieces $a^\times$ $a^3$, substantially parallel with the top plate, (see Fig. 3,) two side plates or pieces $a^4$ $a^5$, (see Fig. 2,) and two cross or end plates or pieces $a^6$ $a^7$, secured to the side plates in any suitable manner. The cross plates or pieces $a^6$ $a^7$ support stud-carrying surfaces (shown as cylinders or rollers $b$) having mounted on them indicating disks or wheels $a^{10}$ and adding disks or wheels $a^9$, provided on their periphery, as herein shown, with the numbers from 0 to 9, inclusive. The disks or wheels $a^9$ $a^{10}$ register with the apertures $a'$ $a^2$, respectively, in the top of the case A, there being as many disks as there are apertures. The apertures in the upper row are in a substantially vertical plane with the apertures in the lower or bottom row.

The disk $a^{10}$, as herein shown, is made fast on a cylinder or roller $b$, as by a key $a^{50}$, (see Fig. 7,) and the said roller is provided with a series of projections, studs, or teeth $b'$, arranged helically about the said roller, and the latter is supported at its ends, preferably by centering screws or points $b^2$ $b^3$, extended through the cross plates or pieces $a^6$ $a^7$. The centering-screw $b^3$ is extended through a sleeve $b^4$, (see Fig. 7,) upon which is mounted the disk $a^9$, and the said sleeve is provided, as herein shown, with a toothed or serrated flange or ring $b^5$, constituting one member of one form of clutch mechanism, the co-operating member of which is herein shown as a like toothed or serrated flange or ring $b^\times$ on a hub or sleeve $b^6$, made fast on the cylinder or roller $b$, as by a key or spline $b^{40}$. (See Fig. 7.) The hub $b^6$ is provided with an annular groove $b^7$, into which are extended studs or pins on a forked arm $b^8$, secured to or forming part of a clutch-operating bar $b^9$, having its ends, as herein shown, extended through suitable openings in the cross plates or pieces $a^6$ $a^7$. The clutch-operating bar $b^9$ is also extended through a slot $b^{10}$ in a locking-bar $b^{12}$, (see Fig. 5,) provided at its upper end with a tooth or projection $b^{13}$, adapted to enter a notch or slot in the periphery of a collar or hub $b^{15}$, fast on the cylinder or roller $b$. The clutch-operating bar $b^9$ is provided with a lug or projection $b^{16}$ on its under side, which engages the locking-bar $b^{12}$ when the clutch-bar $b^9$ is in its normal position (shown in Fig. 3) with the clutch disengaged, and the said clutch-operating bar is moved backward or in the direction of arrow 20 in Fig. 3 when permitted by the locking-bar $b^{12}$, preferably by a spring $c$, acting on a stud or lug $c'$ on the said bar. The cylinder or roller $b$ is rotated by suitable gearing, herein shown as a rack-bar $c^3$, in mesh with a pinion $c^4$ on the said roller, the said rack-bar being actuated, as herein shown, by a spring $c^5$, encircling its lower end and acting against a collar $c^6$ on the said bar, the latter being extended into a guiding cylinder or tube $c^8$, supported in any suitable manner within the case. The locking-bar $b^{12}$ is disengaged from the hub $b^{15}$ on the roller $b$ by a pin or stud $c^{10}$ on a hollow cylinder $c^{12}$, acting on a lug $c^\times$ on the locking-bar, the said cylinder being extended across the case substantially at right angles to the rollers $b$. The cylinder $c^{12}$ is provided with as many studs or projections $c^{10}$ as there are disk-carrying rollers. The hollow cylinder $c^{12}$ is loosely mounted on a shaft or rod $c^{15}$, (see Figs. 2 and 10,) which is encircled within the cylinder by a spring $c^{16}$, having one end fastened to the said shaft or rod $c^{15}$ and its other end to the said cylinder $c^{12}$.

The cylinder $c^{12}$ is provided, as shown in Figs. 2 and 10, with a clutch similar to the clutch on the roller, it consisting of a grooved hub $c^{17}$, fastened to the cylinder $c^{12}$ and provided with a toothed or serrated flange or ring $c^{18}$, adapted to engage a like toothed or serrated flange or ring $c^{19}$, fast on the shaft $c^{15}$, the latter also having fast on it, as herein shown, a ratchet-wheel $c^{20}$, engaged by a push-pawl $c^{21}$, pivoted on a lever or arm $c^{22}$, loose on the shaft $c^{15}$, the said ratchet-wheel being also engaged by a holding-pawl $c^{23}$, (see Figs. 3 and 11,) pivoted, as at $c^{24}$, to the side of the supporting-frame. The lever $c^{22}$ is connected by a link $c^{25}$ to a connecting-bar $c^{26}$, joined at its opposite ends to parallel links $c^{27}$ $c^{28}$, pivoted to the supporting-frame. The connecting-bar $c^{26}$ extends over and normally rests upon rocking cross-bars $d$ $d$, pivotally supported at their ends in the sides of the supporting-frame, there being as many such bars as there are numbers on the disks or wheels. The cross-bars $d$ are rounded or of eccentric shape on their upper surfaces, as clearly shown in Fig. 3, and each bar has fastened to it a link $d'$, pivoted to a rod or bar $d^2$, (see Fig. 2,) which is itself pivotally connected to an elbow or bell-crank lever $d^3$, (see Fig. 3,) loosely mounted on a shaft or rod $d^4$, the said lever having one arm $d^5$ extended through a slot $d^6$ in the front of the inclosing case and preferably provided with a finger-piece or plate $d^7$, having upon it one of the numbers from 0 to 9, as represented in Fig. 2.

The rocking or cam-shaped bars $d$ have resting upon them stops for the disk-carrying rollers, (shown as bars or rods $e$,) extended through holes or openings in the plates $a^2$ $a^3$, and which are designed to engage the studs or pins $b'$ on the roller $b$. In practice there will be as many bars or rods $e$ as there are pins or studs $b'$ on the roller $b$, which number is herein shown as ten to correspond to the numerals on the disks.

In operation the finger-piece $d^7$ and the arm $d^5$ of one of the elbow or key levers $d^3$ is depressed into its dotted-line position (shown in Fig. 3) and the rod $d^2$ is carried backward, and the innermost end of the said rod describes the arc of a circle, as indicated by the dotted line 2, the center of which is the pivot of the eccentric-shaped bar, to which the link $d'$ is fastened, which is herein shown as the innermost bar. As the link $d'$ describes the arc of a circle the eccentric bar $d$, to which the said link is attached, is rocked on its pivots and the cam-face of the said bar raises the stopping-bar $e$, resting upon it, up into the path of movement of a pin or stud $b'$ on the roller $b$. The cam-surface of the rocking bar also acts upon and lifts the connecting-bar $c^{26}$, and at the same time carries the said bar backward, the parallel links $c^{27}$ $c^{28}$ being moved into the position indicated by the dotted lines 3 in Fig. 3. The backward movement of the connecting-bar turns the lever $c^{22}$ on the shaft $c^{15}$, and by means of the pawl $c^{21}$ rotates the cylinder $c^{12}$ the distance of one tooth of the ratchet $c^{20}$. The hollow cylinder $c^{12}$ is normally clutched to the shaft $c^{15}$, as will be described, and its pins or studs $c^{10}$ are in line with the projections or lug $c^\times$ on the locking-bar $b^{12}$, so that when the shaft $c^{15}$ is rotated by the backward movement of the connecting-bar $c^{26}$ a pin $c^{10}$ on the hollow cylinder $c^{12}$ will engage the projection $c^\times$ on the locking-bar and move the said locking-bar downward. As the locking-bar is moved downward the hole or opening $b^{10}$ clears the tooth or projection $b^{16}$ on the bar $b^9$ and permits the said bar to be moved backward by the spring $c$ to engage the toothed ring $b^\times$ of the clutch-hub $b^6$ with the toothed ring $b^5$ on the disk-carrying sleeve $b^4$. When the locking-bar is moved down sufficiently to permit the tooth or projection $b^{16}$ on the bar $b^9$ to pass through the opening $b^{10}$, the said locking-bar is withdrawn from the notched hub $b^{15}$ and the cylinder or roller $b$ is revolved until one of the pins or studs $b'$ strikes the stopping-bar $e$, and when the said cylinder or roller is thus arrested in its revolution the number of the disk $a^{10}$ corresponding to the key-lever depressed will appear in line with the aperture $a^2$ in the top plate, and when starting from 0 the number will also appear in the aperture $a'$. When the proper numbers appear in the apertures, the pressure upon the key-lever is removed and the said lever is restored to its normal or upper position, (shown in Fig. 3,) preferably by a spring $e^{10}$, and the eccentric bar is rocked back into its normal position, and the parallel moving links are restored to their normal position by a spring $e^{12}$. The forward movement of the parallel moving links and their connecting-bar $c^{26}$ causes the lever $c^{22}$ to drop and the pawl $c^{21}$ to click by a tooth into position to rotate the ratchet-wheel $c^{20}$ the distance of another tooth on the next backward movement of the connecting-bar $c^{26}$. When the eccentric bar is rocked back into its normal position, the stop-rods are restored to their normal position (shown in Fig. 3) by gravity, assisted, as shown, by a spring $e^{13}$, acting on a lug $e^{14}$ on the said bar. (See Fig. 9.) After the key-lever $d^3$ has been restored to its normal position and the numbers on the disks are in line with the apertures $a'$ $a^2$ the clutch-actuating bar $b^9$ is restored to its normal position, as herein shown, Figs. 2 and 3, by means of a rod or bar $k$, supported in arms or levers $k'$ $k^2$, fast on a shaft $k^3$, having bearings in the side pieces $a^4$ $a^5$ of the supporting-case. The levers $k'$ $k^2$, as shown, are provided with arms $k^4$, normally kept in engagement with cams or projections $k^5$ on hubs $k^6$, only one of which is shown in Fig. 3, the said hubs being fast on a shaft $k^7$, (see Figs. 2 and 3,) having bearings in the side pieces $a^4$ $a^5$ of the supporting-frame, and through which the said shaft is extended. The shaft $k^7$ outside the side pieces $a^4$ $a^5$ has fastened on it two arms $k^9$ $k^{10}$, provided each with forks $k^{12}$ $k^{13}$, (see Figs. 2 and 6,) one of which forks is normally in engagement with a returning device for the rack-bars $c^3$, the said returning device being herein shown as a bar $k^{14}$, extended through slots $k^{15}$ in the side pieces $a^4 a^5$ of the supporting-frame. The shaft $k^7$ is rotated in one direction to bring the forks $k^{12}$ of the arms $k^9$ $k^{10}$ into engagement with the bar $k^{14}$, and thereby move the said bar downward against the pressure of the spring $c^5$ on the rack-bar by a crank $k^{25}$, fastened on the shaft $k^7$, (see Fig. 6,) and joined by a connecting-rod $k^{16}$ to a lug $k^{17}$ on a lever $k^{18}$, pivoted, as at $k^{19}$, to the inclosing case, the said lever having an arm $k^{20}$ extended out through a slot $k^{21}$ in the front of the case A. The lever $k^{18}$ is acted upon, as herein shown, by a spring $k^{22}$, by which the said lever and the parts connected to it are restored to their normal position. (Indicated by full lines, Fig. 6.)

In practice I may employ any desired number up to ten of cylinders or rollers $b$ and disks $a^{10}$ thereon to be operated by the ten finger keys or levers; but I may employ a greater number of disks $a^9$, if desired, for in accordance with my invention each disk $a^9$ is connected to its adjacent disk $a^9$ by means of gearing, as will be described, whereby one complete revolution of one disk $a^9$—as, for instance, the disk representing units—will rotate the next disk $a^9$, representing tens, one step or number. One form of gearing by which this may be accomplished is shown in detail, Fig. 13. The sleeve $b^4$, upon which is fastened the units-disk $a^9$, is provided, as shown, with a collar $m$, having a tooth $m'$ in mesh with an intermediate gear $m^2$, provided with ten teeth to correspond to the numbers on the disk $a^9$, and the intermediate gear $m^2$ meshes with a gear $m^3$, fastened on the sleeve $b^4$ of the disk $a^9$ representing tens. The sleeve $b^4$ of the disk $a^9$ representing tens is connected by like gearing to the sleeve $b^4$ of the disk representing hundreds, and so on, and any desired number of disks $a^9$ may be used. As shown in Fig. 1, the top plate of the inclosing case is provided with six apertures in each row, and preferably six rollers $b$ will be used; but, if desired, any number of apertures $a^2$ in the lower row of apertures less than the numbers on the disks $a^{10}$ may be used; but by means of the gearing connecting the sleeves $b^4$ of the disks $a^9$ any number of disks $a^9$ greater than the numbers on the said disks may be used—that is, instead of using six disks $a^9$, as represented, seven or more disks $a^9$ may be employed. For instance, I have shown six apertures $a'$ and six apertures $a^2$, with which register six disks $a^9$ $a^{10}$, respectively. If desired, the case A might be provided with ten apertures $a'$ and only four apertures $a^2$, in which case the largest number that would be added at any one operation would be one of four figures; but owing to the connecting-gearing between the disks $a^9$ this number may be added many times, and, if desired, until the total reached into the billions, or ten figures. The hollow cylinder $c^{12}$ normally has its clutch-ring $c^{18}$ in engagement with the clutch-ring $c^{19}$ and is held in such engagement by the spring $c^{16}$, and when in its normal position the studs or projections $c^{10}$ on the said cylinder are in line with the lugs or projections $c^x$ on the locking-bars $b^{12}$. When the lever $k^{20}$ is depressed to restore the clutch-operating bars $b^9$ to their normal position, the hollow cylinder $c^{12}$ is moved longitudinal on its shaft or rod $c^{15}$ by means of a clutch-lever $m^5$, pivoted, as shown, in lugs or arms $m^6$, (see Figs. 2, 3, and 4,) secured to the side plate $a^4$ of the machine. The clutch-lever $m^5$ is provided, as shown, with a finger or projection $m^7$, (see Fig. 4,) which is acted upon by a cam hub or collar $m^8$ on the shaft $k^7$ when the restoring-lever $k^{20}$ is operated, the said cam-hub moving the clutch-lever into the position shown in Fig. 4, and thereby moving the hollow cylinder $c^{12}$ longitudinally on its shaft and carrying the studs $c^{10}$ thereon out of the path of movement of the lugs or projections $c^x$ on the locking-bars $b^{12}$. When the cylinder $c^{12}$ is disengaged from its clutch, it is free to be revolved back to its normal or starting position by its spring $c^{16}$, a lug or projection $m^{10}$ on the cylinder engaging a stop $m^{12}$, secured to the side plate $a^5$ of the supporting-frame.

The locking-bar $b^{12}$ may be moved upward into its normal position by a spring $m^{50}$, (see Fig. 5,) acting on its under side.

My improved apparatus, among other things, is especially adapted to be used by book-keepers and like persons and in any place where it is desired to automatically obtain the sum or total of different numbers or amounts. As shown in Fig. 1, the number 6,413 appears in the top row of the apertures and 44 in the lower row of apertures. If now it were desired to add 512 to the total 6,413, represented in the top row of apertures, the operator would depress the finger-keys $d^7$ marked 5 1 2 in Fig. 2 in the reverse order—that is, he would first depress the units finger-key marked 2, next the tens finger-key marked 1, and then the hundreds finger-key marked 5.

The key-levers are depressed in the order referred to because of the position of the studs $c^{10}$ on the hollow cylinder $c^{12}$, for in the normal or starting position of the said cylinder the lug $c^{10}$, adapted to operate upon the locking-bar controlling the units-roller $b$, is in engagement with or rests upon the lug $c^x$ on the units locking-bar, and when the units key-lever is depressed the stud $c^{10}$, adapted to operate the lug $c^x$ on the locking-bar controlling the tens-roller $b$, is brought into engagement with the lug $c^x$ on the said tens locking-bar ready to move said tens locking-bar when the tens key-lever is depressed. As represented in Fig. 1, the number 44 has been added, and if it is desired to add a new number—say 44 again—the operator depresses the lever $k^{20}$ and restores all the parts of the mechanism to their normal position, with the exception of the adding-disks $a^9$, and when thus restored to their starting or normal position 44 or any other desired number may be added. If the operator by mistake should add 45 or any number other than the correct number, he may turn the disks $a^9$ $a^{10}$ back to the position they occupied before adding the wrong number by pushing upon the rack-bars $c^3$, which have been raised by the depression of the key-levers.

I prefer to employ the disks $a^9$; but it is evident that the said disks may be omitted and the disk $a^{10}$ alone used when it is desired to employ the said disks $a^{10}$ as indicating devices alone and not in conjunction with the adding-disks $a^9$.

I claim—

1. The combination, with a plurality of rollers or stud-carrying surfaces provided with projections or studs arranged about the said shafts, as described, and disks or wheels connected to said rollers to rotate therewith, of stopping devices adapted to engage the studs on the said rollers, rocking bars to operate said stopping devices, key-levers connected to said rocking bars, locking devices for said rollers, a cylinder provided with studs or projections to operate said locking devices, and mechanism, substantially as described, connected to the said cylinder and operated by movement of the rocking bars to unlock the said rollers, and means to rotate the said rollers, substantially as described.

2. The combination, with a plurality of rollers or stud-carrying surfaces provided with projections or studs arranged as described, and disks or wheels connected to said rollers to rotate therewith, of independent disks or wheels co-operating with the disks or wheels on the rollers, clutch mechanism to connect the said rollers with the independent disks or wheels, gearing to connect the independent disks or wheels, stopping devices to engage the studs on the rollers, means to operate said stopping devices, key-levers connected to the said means, clutch-operating bars, locking devices for the rollers, and means to operate said locking devices when a key-lever is operated, substantially as described.

3. The combination, with a plurality of rollers or stud-carrying surfaces provided with projections or studs arranged about the said rollers, as described, and disks or wheels connected to said rollers to rotate therewith, of independent disks or wheels co-operating with the disks on the said rollers, gearing to connect the independent disks, clutch mechanisms to couple together the said rollers and independent disks, means to rotate the said rollers, locking devices for the rollers, means to operate the locking devices, stops to engage the projections on the said rollers, rocking bars to operate the said stops, keys connected to the rocking bars, and means to restore the said rollers and disks to their normal position, substantially as described.

4. The combination, with a roller provided with studs arranged as described, of a disk secured to said roller to rotate therewith, means to revolve said roller, a locking device for the shaft, means to operate the locking device, stops to engage the studs on the roller, rocking devices to actuate said stops, and keys connected to the rocking devices, substantially as described.

5. The combination, with a plurality of stud-carrying surfaces provided with studs arranged as described, of independent disks co-operating with the said rollers, gearing to connect the independent disks, clutch mechanisms to couple the independent disks to the said rollers, locking devices for the said rollers and clutch mechanisms, stops to engage the studs on the rollers, a cylinder provided with projections to engage the locking devices, rocking bars to actuate the stops, means to rotate the said cylinder, actuated by movement of the rocking bars, and key-levers connected to the rocking bars, to operate substantially as described.

6. The combination, with a plurality of stud-carrying surfaces provided with studs or projections arranged as described, of independent disks co-operating with the said stud-carrying surfaces, gearing to connect the independent disks together, clutch mechanisms to couple the independent disks to the stud-carrying surfaces, clutch-operating bars connected to the said clutch mechanisms, locking-bars for said stud-carrying surfaces and clutch-operating bars, stops to engage the studs on the stud-carrying surfaces, rocking bars to actuate said stops, means to rock said bars, a hollow cylinder provided with projections to engage the locking-bars, a shaft on which said cylinder is loosely mounted, a clutch mechanism to render said cylinder fast on its shaft, mechanism actuated by the rocking bars to rotate the said cylinder in one direction, means to rotate it in the opposite direction, pinions on the disk-carrying and stud-carrying surfaces, rack-bars in mesh with the said pinions, means to restore the rack-bars to their normal position, a rock-shaft provided with forked arms to engage the restoring device for the rack-bars, and a cam on the said rock-shaft to actuate the clutch mechanism for the hollow cylinder, substantially as described.

In testimony whereof I have signed my name to this specification in the presence of two subscribing witnesses.

CARL E. RICHSON.

Witnesses:
JAS. H. CHURCHILL,
E. L. RICHARDS.